(12) United States Patent
Hsu et al.

(10) Patent No.: US 10,529,994 B2
(45) Date of Patent: Jan. 7, 2020

(54) SEAWATER BATTERY CIRCULATION SYSTEM, SEAWATER BATTERY, CATHODE OF SEAWATER BATTERY AND FABRICATION METHOD THEREOF

(71) Applicant: NATIONAL TSING HUA UNIVERSITY, Hsinchu (TW)

(72) Inventors: Wen-Kuang Hsu, Hsinchu (TW); Hsiao-Ling Chen, Hsinchu (TW); Hsin-Jung Tsai, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 266 days.

(21) Appl. No.: 15/226,910

(22) Filed: Aug. 2, 2016

(65) Prior Publication Data

US 2017/0301927 A1    Oct. 19, 2017

(30) Foreign Application Priority Data

Apr. 18, 2016   (TW) .............................. 105112027 A

(51) Int. Cl.
| | |
|---|---|
| *H01M 6/02* | (2006.01) |
| *H01M 6/34* | (2006.01) |
| *H01M 4/08* | (2006.01) |
| *H01M 4/46* | (2006.01) |
| *H01M 4/66* | (2006.01) |
| *H01M 4/74* | (2006.01) |

(Continued)

(52) U.S. Cl.
CPC ............... *H01M 6/34* (2013.01); *H01M 4/08* (2013.01); *H01M 4/364* (2013.01); *H01M 4/46* (2013.01); *H01M 4/463* (2013.01); *H01M 4/583* (2013.01); *H01M 4/602* (2013.01); *H01M 4/661* (2013.01); *H01M 4/74* (2013.01); *H01M 6/02* (2013.01); *H01M 2220/10* (2013.01)

(58) Field of Classification Search
CPC .......... H01M 4/08; H01M 4/364; H01M 4/46; H01M 4/463; H01M 4/583; H01M 4/602; H01M 4/661; H01M 4/74; H01M 6/02; H01M 6/34; H01M 2220/10
See application file for complete search history.

(56) References Cited

U.S. PATENT DOCUMENTS 7,061,749 B2 *   6/2006   Liu ........................ B82Y 10/00
                                                    361/502
2012/0276457 A1 *  11/2012  Hirose .................. H01M 4/134
                                                     429/405
(Continued)

FOREIGN PATENT DOCUMENTS

| CN | 2255666 Y | 6/1997 |
|---|---|---|
| CN | 102479961 A | 5/2012 |

(Continued)

OTHER PUBLICATIONS

English translation of CN Publication 104112844, Oct. 2014.*

*Primary Examiner* — Brittany L Raymond
(74) *Attorney, Agent, or Firm* — CKC & Partners Co., LLC

(57) ABSTRACT

A seawater battery includes an anode and a cathode corresponding to the anode. The cathode cooperates with the anode to produce a current and includes a metal substrate and a mixture coating layer. The mixture coating layer covered on the metal substrate includes a conductive polymer material and a plurality of carbon nanotubes mixed with the conductive polymer material.

14 Claims, 17 Drawing Sheets

(51) Int. Cl.
*H01M 4/60* (2006.01)
*H01M 4/36* (2006.01)
*H01M 4/583* (2010.01)

(56) References Cited

U.S. PATENT DOCUMENTS

| | | | |
|---|---|---|---|
| 2012/0292187 A1 | 11/2012 | Kim et al. | |
| 2013/0108935 A1* | 5/2013 | Dornajafi | H01M 2/34 |
| | | | 429/409 |
| 2014/0370380 A9 | 12/2014 | Cui et al. | |
| 2016/0276649 A1* | 9/2016 | Turney | H01M 8/18 |
| 2017/0141398 A1* | 5/2017 | Wu | H01M 4/06 |

FOREIGN PATENT DOCUMENTS

| | | | |
|---|---|---|---|
| CN | 102544432 | A | 7/2012 |
| CN | 103887475 | A | 6/2014 |
| CN | 104112844 | * | 10/2014 |
| CN | 104112844 | A | 10/2014 |
| TW | I347025 | B | 8/2011 |
| TW | I375347 | B | 10/2012 |
| TW | 201338255 | A | 9/2013 |
| TW | I464953 | B | 12/2014 |
| TW | I504036 | B | 10/2015 |

* cited by examiner

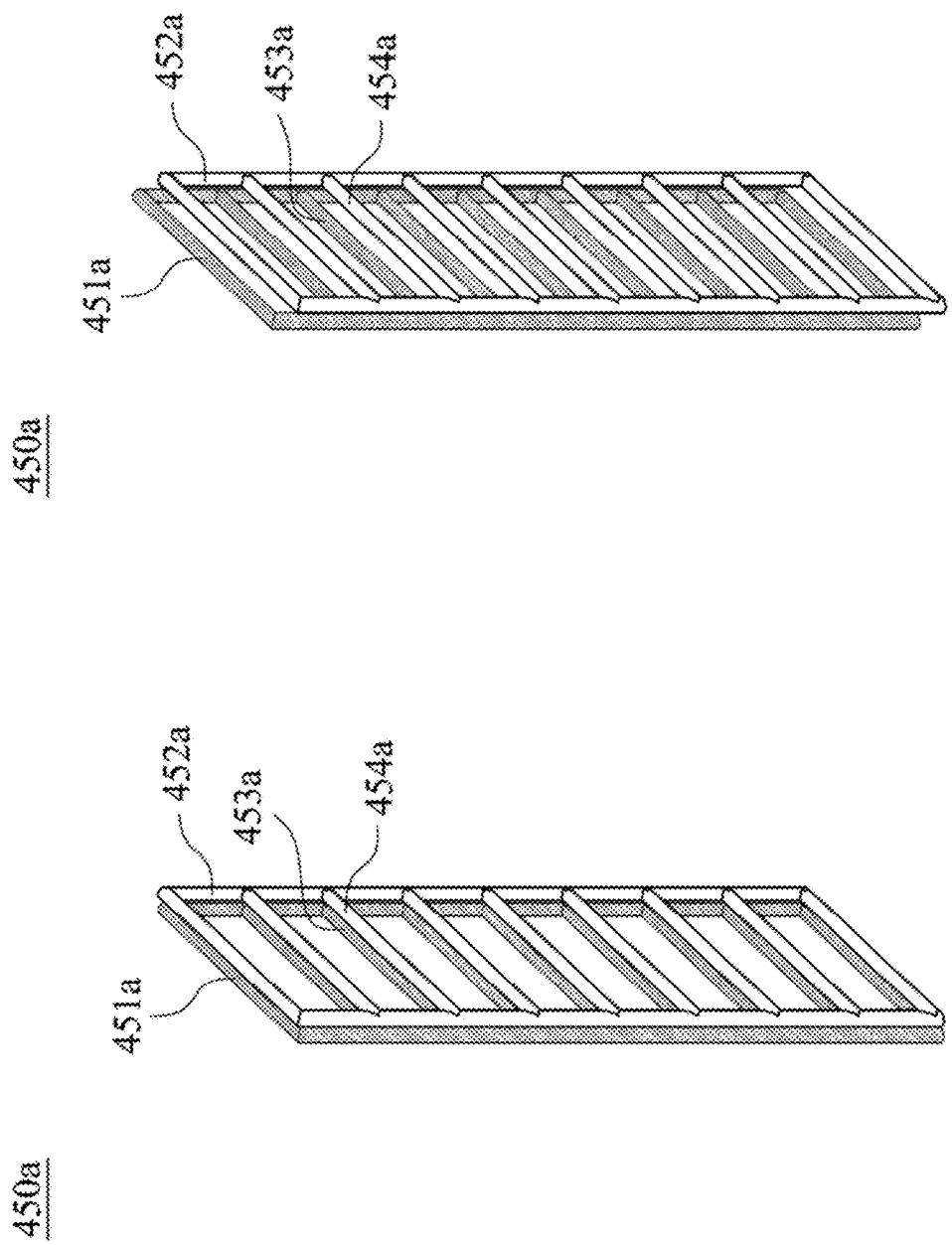

SEAWATER BATTERY CIRCULATION SYSTEM, SEAWATER BATTERY, CATHODE OF SEAWATER BATTERY AND FABRICATION METHOD THEREOF

RELATED APPLICATIONS

This application claims priority to Taiwan Application Serial Number 105112027, filed Apr. 18, 2016, which is herein incorporated by reference.

BACKGROUND

Technical Field

The present disclosure relates to a battery circulation system, a battery, a cathode of a battery and a fabrication method thereof. More particularly, the present disclosure relates to a seawater battery circulation system, a seawater battery, a cathode of a seawater battery and a fabrication method thereof.

Description of Related Art

Ocean, being large and full of resources, is an important area in development and research. The conventional power sources for ocean activities are lithium-ion batteries, Zinc-oxygen batteries or hydrogen-oxygen fuel cells, but they have been replaced by seawater batteries recently.

Because the percentage of dissolved oxygen in seawater is about 5 ppm to 10 ppm and the seawater has high conductivity due to lots of sodium chloride contained therein, the seawater can be adapted as an electrolyte to generate power. In the past, magnesium is applied as an anode of a seawater battery while silver chloride, copper chloride or cuprous chloride is applied as a cathode of the seawater battery. Oxidation occurs at the anode made of an active metals which can be corroded by the seawater. As a result, anions released by the active metal transfer from the anode to the cathode through an outside circuit to form a current, and cations are released into the seawater.

Magnesium ions released from the corroded anode into the seawater will not attack ecology of ocean because magnesium ions are present in the seawater originally. However, a reduction at the cathode occurs after the anions receive the cations, and metals produced thereof will attack the environment. Hence, Carbon is used as a new cathode material. A carbon material conventionally used is a carbon fiber, which has advantages of low pollution and low cost. But it still has disadvantages of high resistance and hydrophobicity. Although the hydrophobicity can be overcame by oxidation or acidification, the inter resistance will increase due to damages of the conjugate structure of carbon and decrease the power generating efficiency.

Moreover, green energies, such as solar energy and wind energy, become more and more important owing to the rising awareness of environment protection. The wind energy is lack of power generating efficiency and the solar energy is limited to the sunshine duration; consequently, both of them cannot be substituted for thermal power generation or nuclear power generation. Therefore, if a seawater battery with low pollution and high efficiency can be developed, a seawater power generation stand can be set on the coastal through serially connecting lots of seawater batteries to generate more green energy.

Base on the aforementioned problems, how to develop a seawater battery with low pollution and high efficiency becomes a pursuit target for practitioners.

SUMMARY

According to one aspect of the present disclosure, a cathode of a seawater battery includes a metal substrate and a mixture coating layer. The mixture coating layer covered on the metal substrate includes a conductive polymer material and a plurality of carbon nanotubes mixed with the conductive polymer material.

According to another aspect of the present disclosure, a seawater battery include an anode and a cathode corresponding to the anode. The cathode cooperates with the anode to produce a current and includes a metal substrate and a mixture coating layer. The mixture coating layer covered on the metal substrate includes a conductive polymer material and a plurality of carbon nanotubes mixed with the conductive polymer material.

According to another aspect of the present disclosure, a fabrication method of a cathode of a seawater battery includes providing a metal substrate, forming a mixture coating liquid including a conductive polymer material and a plurality of carbon nanotubes, coating the mixture coating liquid on the metal substrate, and drying the mixture coating liquid at a room temperature to form a mixture coating layer on an outside surface of the metal substrate.

According to another aspect of the present disclosure, a seawater battery circulation system applied to a seawater includes a pumping device, a seawater storing device, an aerating device, the seawater battery mentioned above, and a filtering device. The pumping device is for pumping the seawater. The seawater storing device connected to the pumping device is for storing the seawater. The aerating device disposed in the seawater storing device is for increasing an amount of dissolved oxygen of the seawater. The seawater battery is connected to the seawater storing device and allows the seawater flowing in to produce a power. The filtering device connected to the pumping device is for filtering an impurity of the seawater and includes a precipitate collecting device for collecting the impurity.

BRIEF DESCRIPTION OF THE DRAWINGS

The disclosure can be more fully understood by reading the following detailed description of the embodiment, with reference made to the accompanying drawings as follows:

FIG. 15A shows three dimensional view of an adjusting unit of FIG. 14; and

FIG. 15B shows another three dimensional view of the adjusting unit of FIG. 14.

DETAILED DESCRIPTION

Figure 1:
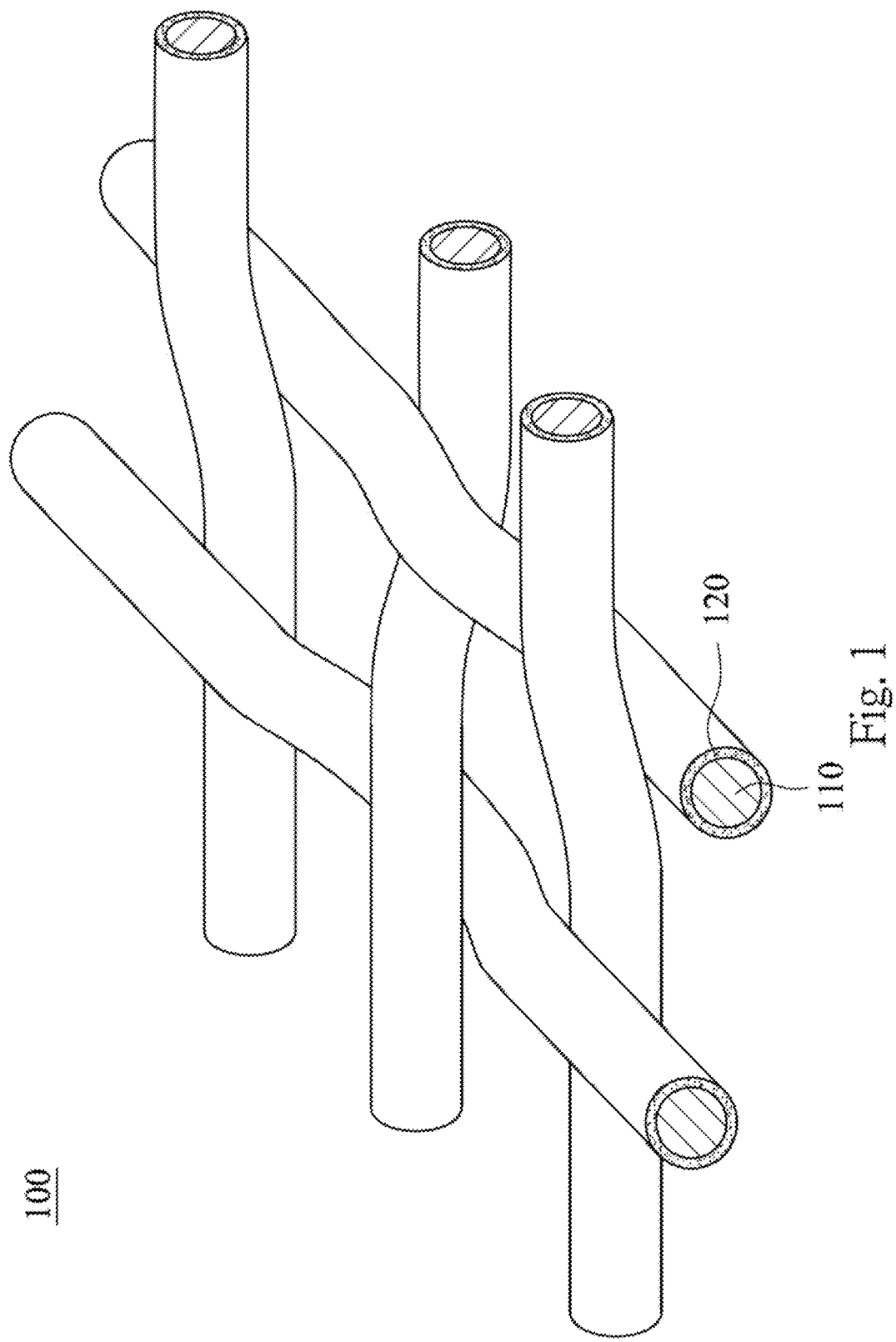
FIG. 1 shows a three dimensional view of a cathode of a seawater battery according to one embodiment of the present disclosure.
Figure 2:
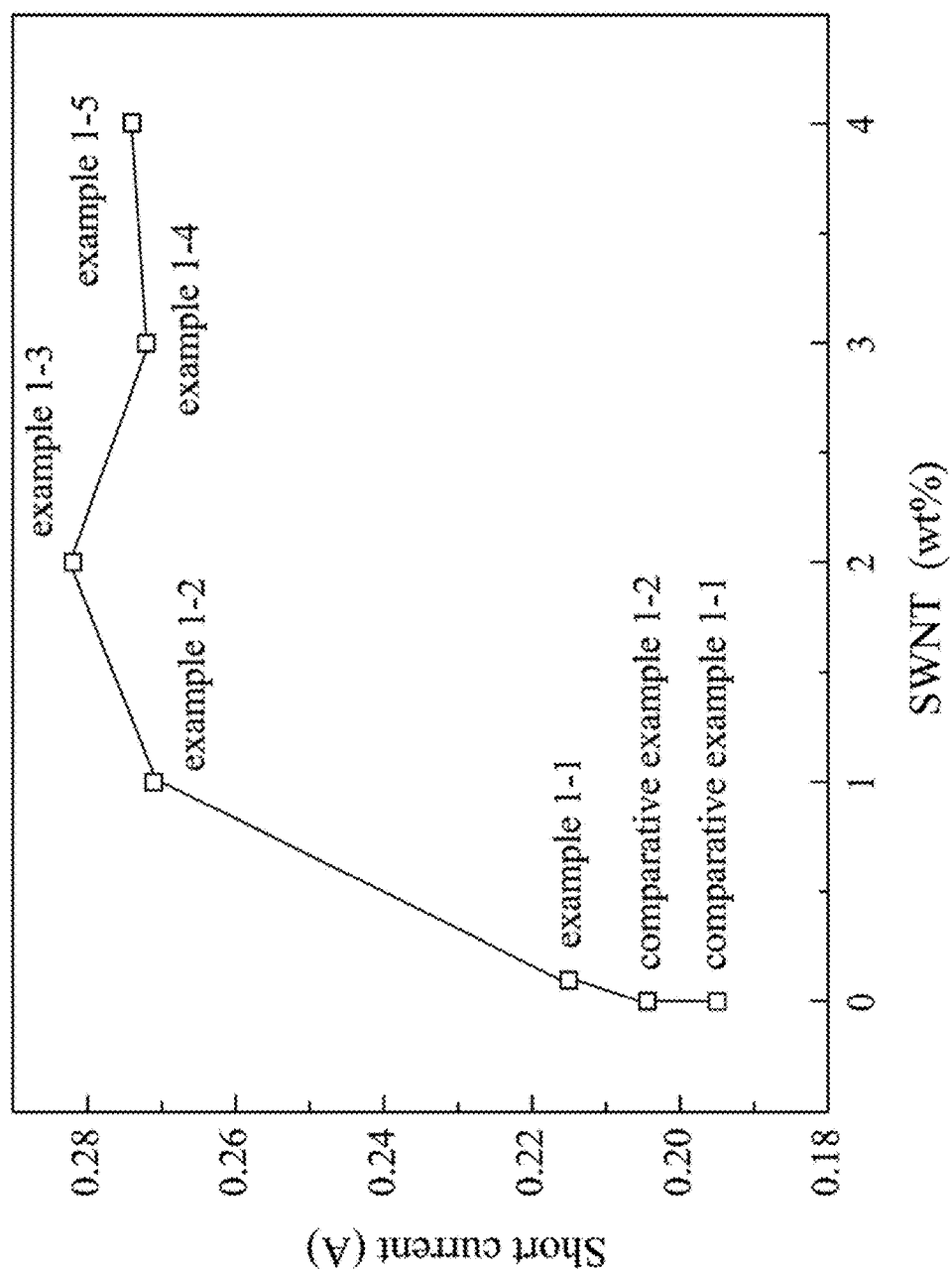
FIG. 2 shows results of short currents of seawater batteries for two comparative examples 1-1, 1-2 and five examples 1-1 to 1-5.

FIG. 1 shows a three dimensional view of a cathode 100 of a seawater battery according to one embodiment of the present disclosure. FIG. 2 shows results of short currents of the seawater batteries for two comparative examples 1-1, 1-2 and five examples 1-1 to 1-5. A cathode 100 of a seawater battery includes a metal substrate 110 and a mixture coating layer 120. The mixture coating layer 120 covered on the metal substrate 110 includes a conductive polymer material 121 (shown in FIG. 4B) and a plurality of carbon nanotubes 122 (shown in FIG. 4B) mixed with the conductive polymer material 121.

Therefore, the mixture coating layer 120 covered on the metal substrate 110 can protect the metal substrate 110 from corroding by the seawater, and the conductivity of the conductive polymer material 121 and the carbon nanotubes 122 can increase electron transport ability of the cathode 100. The material, structure and the fabrication method of the cathode 100 will be described in detail in the following paragraphs.

The metal substrate 110 is used for conducting, which can be made of any metal materials. In the embodiment of FIG. 1, the metal substrate 110 can be a mesh-shaped substrate made of nickel. But the metal substrate 110 can also be a board-shaped substrate made of stainless steel and will not be limited thereto.

The mixture coating layer 120 is formed by combining the conductive polymer material 121 with the carbon nanotubes 122, which is a mixture in chemistry, and is for covering the metal substrate 110. Precisely, if the metal substrate 110 is a mesh-shaped substrate and includes a plurality of metal wires, the mixture coating layer 120 will cover on an outside surface of each metal wire.

Because the conductive polymer material 121 has conductivity, it can not only prevent the metal substrate 110 from oxygenizing by the seawater, but also can transport the electrons into the seawater for oxygen reduction action. After combining the carbon nanotubes 122 with the conductive polymer material 121, free paths of the electrons will be increased; therefore, the conductivity of the mixture coating layer 120 can be improved. Furthermore, the carbon nanotubes 122 can adsorb few metal-ions released from the cathode 100 so as to prevent the metal-ions from spreading into the ocean to lead environmental pollution. Moreover, the carbon nanotubes 122 can strengthen the structure strength of the conductive polymer material 121 to increase the life time of the cathode 100.

As shown is FIG. 2, when seawater batteries apply different cathodes, the current characteristics thereof will be changed. A cathode of the comparative example 1-1 is made by a metal substrate, a cathode of the comparative example 1-2 is made by a metal substrate covered by a conductive polymer material, and each of the cathode of the examples 1-1 to 1-5 is made by the metal substrate 110 covered by the mixture coating layer 120 as stated above. The metal substrates of the comparative examples 1-1 and 1-2 and the examples 1-1 to 1-5 are all mesh-shaped substrates made of nickel. The conductive polymer materials of the comparative example 1-2 and the examples 1-1 to 1-5 are all PEDOT:PSS (poly(3,4-ethylenedioxythiophene) polystyrene sulfonate, hereafter PEDOT:PSS). The carbon nanotubes of the examples 1-1 to 1-5 are single-wall carbon nanotubes. And in fabrication processes, the weight percentage of the carbon nanotubes of each of the comparative examples 1-1 and 1-2 and the examples 1-1 to 1-5, as shown in Table 1, is different from each other.

TABLE 1

|  | Comparative example 1-1 | Comparative example 1-2 | Example 1-1 | Example 1-2 |
|---|---|---|---|---|
| Carbon nanotube wt % | 0 | 0 | 0.1 | 1 |

|  | Example 1-3 | Example 1-4 | Example 1-5 |
|---|---|---|---|
| Carbon nanotube wt % | 2 | 3 | 4 |

It can be known from FIG. 2 that the short current of the cathode made by the metal substrate is smallest. The short current of the cathode made by metal substrate covered by the conductive polymer material is smaller than that of the cathode made by the metal substrate 110 covered by the mixture coating layer 120. And the short current of the cathode increase as the weight percentage of the carbon nanotubes increasing.

Figure 3A:
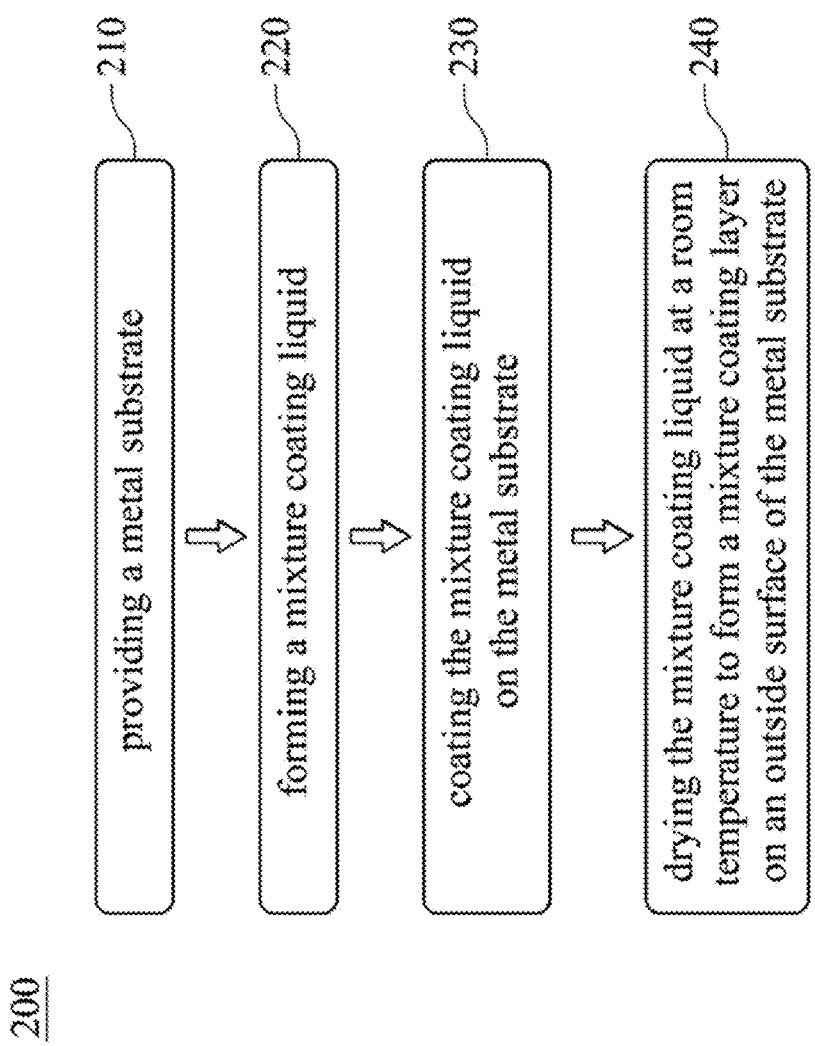
FIG. 3A shows a flow diagram of a fabrication method of a cathode of a seawater battery according to one embodiment of the present disclosure.
Figure 3B:
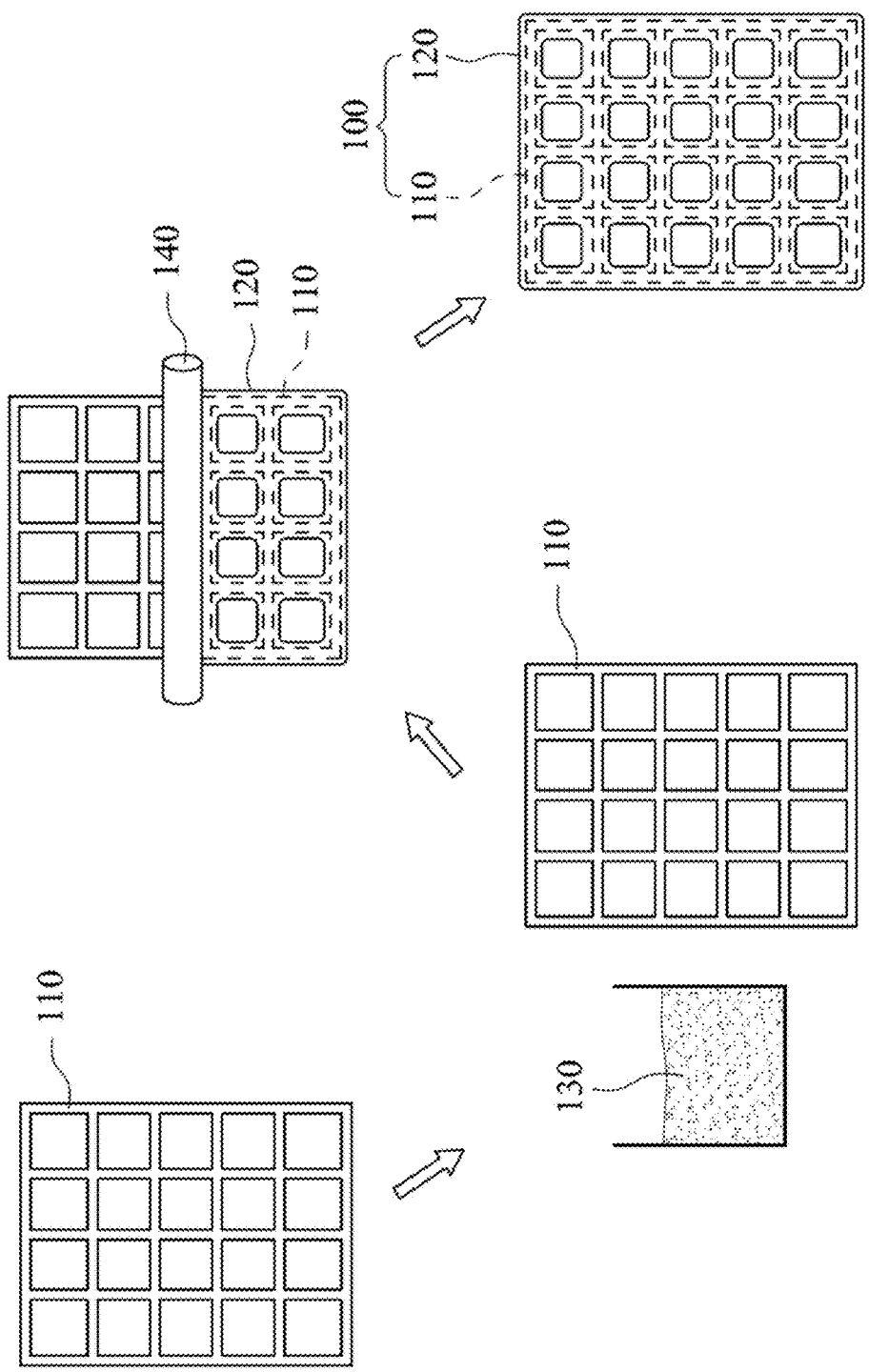
FIG. 3B shows a schematic diagram of the fabrication method of FIG. 3A.

FIG. 3A shows a flow diagram of a fabrication method 200 of a cathode of a seawater battery according to one embodiment of the present disclosure. FIG. 3B shows a schematic diagram of the fabrication method 200 of FIG. 3A. The fabrication method 200 of the cathode of the seawater battery includes Step 210, Step 220, Step 230 and Step 240.

In Step 210, a metal substrate 110 is provided.

In Step 220, a mixture coating liquid 130 is formed, which includes a conductive polymer material 121 and a plurality of carbon nanotubes 122.

In Step 230, the mixture coating liquid 130 is coated on the metal substrate 110 through a coating bar 140. The coating bar 140 is dipped into the mixture coating liquid 130 first, then is rolled on the metal substrate 110 to coat the mixture coating liquid 130.

In Step 240, a mixture coating layer 120 is formed on an outside surface of the metal substrate 110 via drying the mixture coating liquid 130 at a room temperature. Because the mixture coating liquid 130 is dried at the room temperature, the conductive polymer material 121 and the carbon nanotubes 122 can remain the essential properties thereof.

Figure 4A:
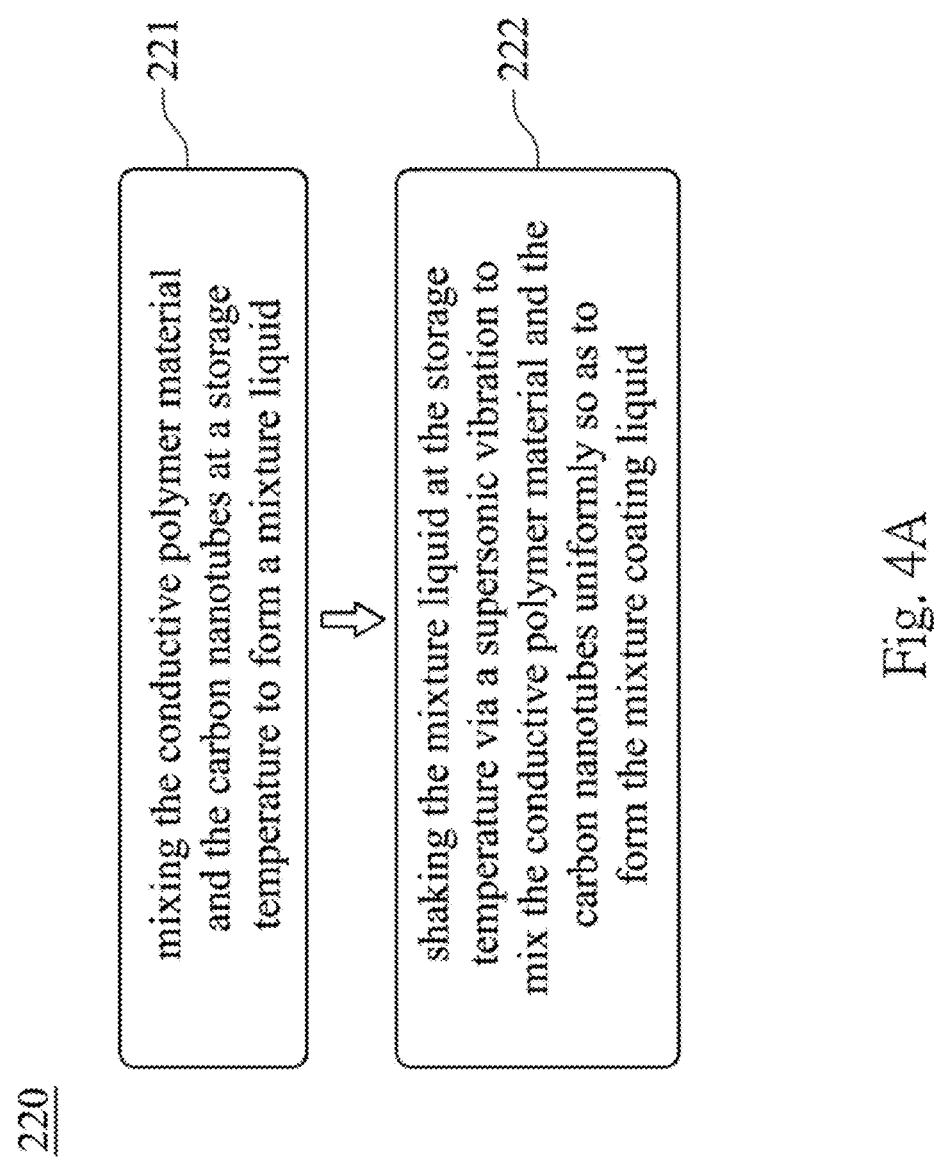
FIG. 4A shows a flow diagram of Step 220 of the fabrication method of FIG. 3A.
Figure 4B:
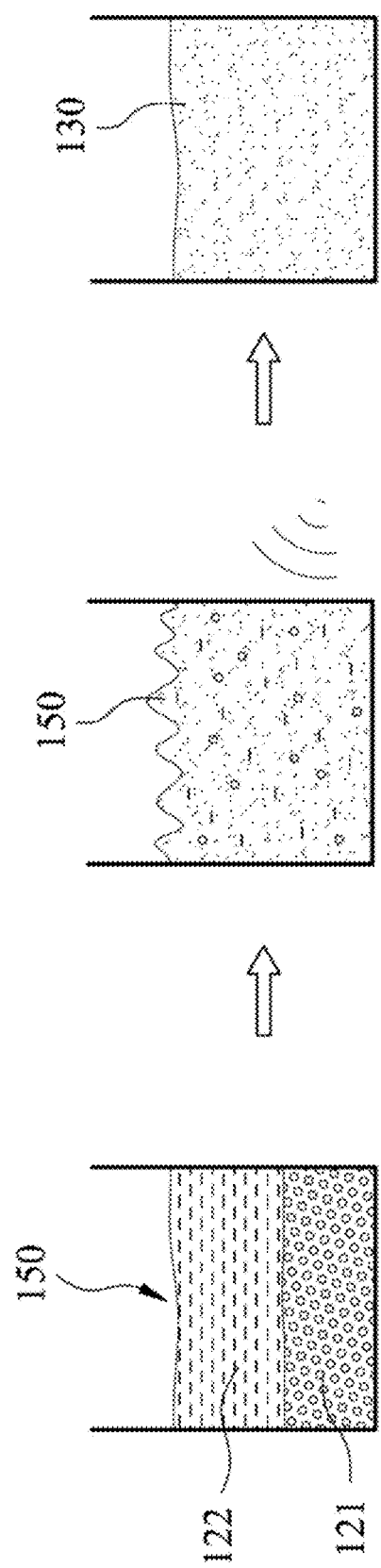
FIG. 4B shows a schematic diagram of Step 220 of FIG. 4A.

FIG. 4A shows a flow diagram of Step 220 of the fabrication method of FIG. 3A. FIG. 4B shows schematic diagram of Step 220 of FIG. 4A. Step 220 includes Step 221 and Step 222.

In Step 221, a mixture liquid 150 is formed by mixing the conductive polymer material 121 with the carbon nanotubes 122 at a storage temperature of the conductive polymer material 121. In one embodiment, the conductive polymer material 121 is PEDOT:PSS, and the storage temperature is 4° C. to 8° C. The PEDOT:PSS is not easy to be pyrolyzed while operating in the seawater battery because of its high heat resistance. The conductivity of PEDOT:PSS is higher than other polymers, and PEDOT:PSS has good coating ability; therefor, the conductivity and lifetime of the cathode will be increased. The conductive polymer material 121 can be any other polymers with conductivity, and will not be limited thereto. The weight percentage of the carbon nanotubes 122 can be 0.1 to 35 when mixing the conductive polymer material 121 and the carbon nanotubes 122. Preferably, the weight percentage of the carbon nanotubes 122 can be 0.1 to 6, and the characteristic of the cathode 100 will become better.

In Step 222, the mixture coating liquid 130 is formed by shaking the mixture liquid 150 at the storage temperature via a supersonic vibration to mix the conductive polymer material 121 and the carbon nanotubes 122 uniformly. Through high-speed vibration, the mixture of the conductive polymer material 121 and the carbon nanotubes 122 can become uniform in a short time. The virtual implementations can be continually vibrating the mixture liquid 150 in a while via a supersonic vibrator, or be repetitively vibrating the mixture liquid 150 for a fixed-time period several times via a handheld supersonic homogenizer. However, the implementations and the devices for uniformly mixing the mixture liquid 150 are not limited thereto.

Figure 5B:
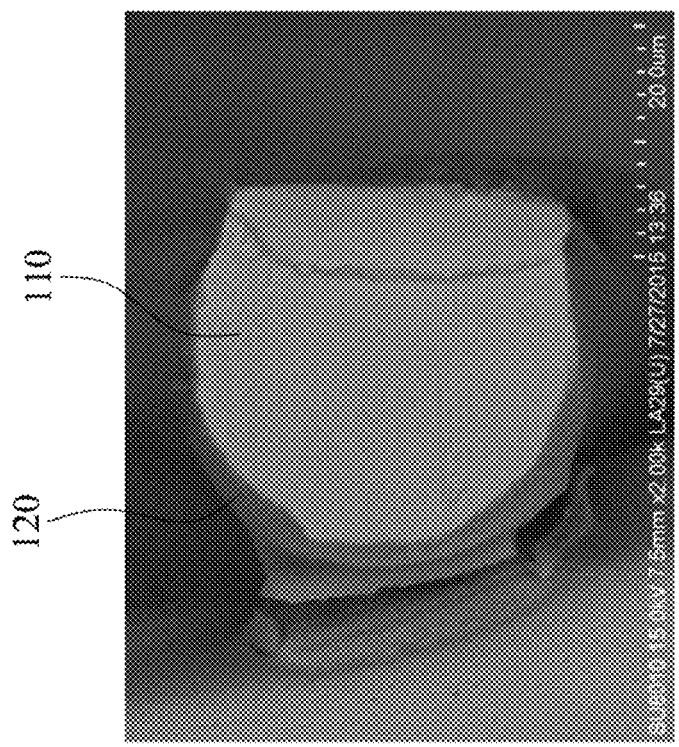
FIG. 5B shows a SEM result of a cathode at 2000× magnification according to another embodiment of the present disclosure.
Figure 5A:
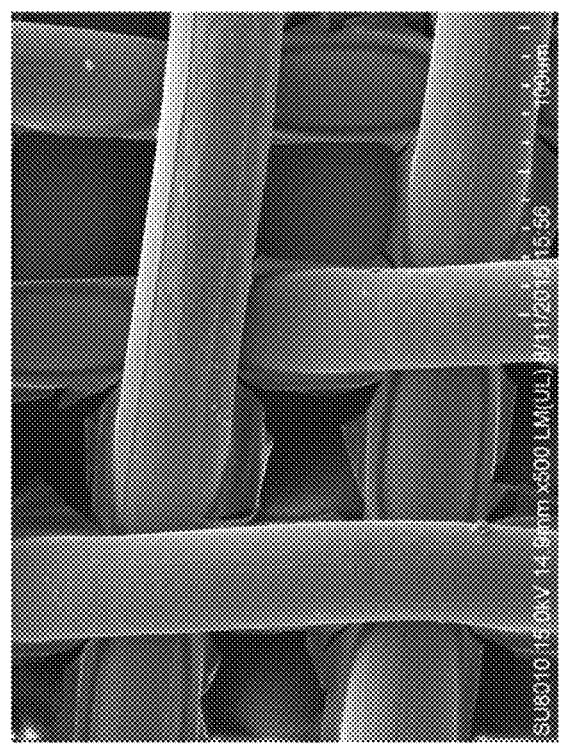
FIG. 5A shows a SEM result of a cathode at 500× magnification according to another embodiment of the present disclosure.

FIG. 5A shows a SEM result of a cathode at 500× magnification according to another embodiment of the present disclosure. FIG. 5B shows a SEM result of a cathode at 2000× magnification according to another embodiment of the present disclosure. It can be known from FIGS. 5A and 5B that the cathode 100 can be made via covering the metal substrate 110 by the mixture coating layer 120 base on the above mentioned fabrication method 200.

Figure 6:
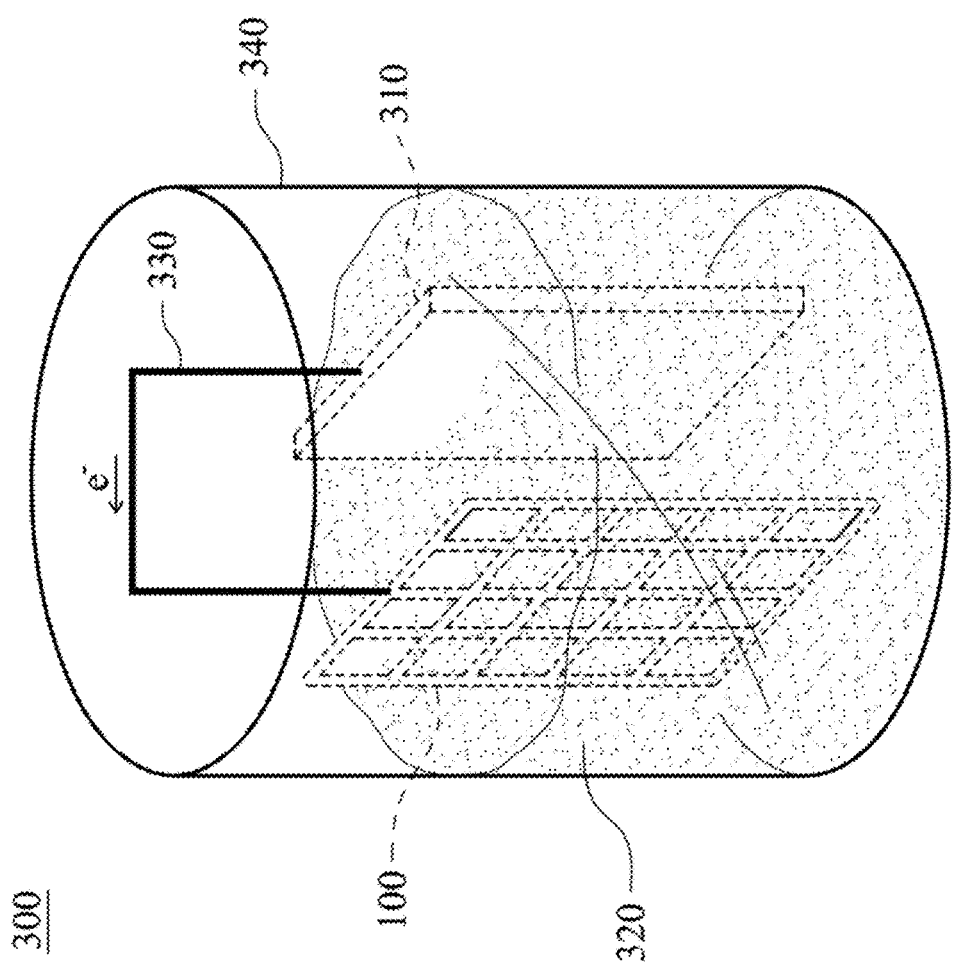
FIG. 6 shows a three dimensional view of a seawater battery according to one embodiment of the present disclosure.

FIG. 6 shows a three dimensional view of a seawater battery 300 according to one embodiment of the present disclosure. A seawater battery 300 includes an anode 310 and a cathode 100. The cathode 100 is corresponding to the anode 310 and cooperates with the anodes 310 to produce a current (not shown). The structure of the cathode 100 is described in the preceding paragraphs and there will not be described again.

In this embodiment, the seawater battery 300 further includes a case 340, a seawater 320 and a wire 330. The seawater 320 is stored in the case 340, and at least one part of the anode 310 and the cathode 100 soak in the seawater 320. The wire 330 connects the cathode 100 to the anode 310.

In detail, the anode 310 is made of high active metal, and it is made of magnalium in the embodiment of FIG. 6, but the anode 310 can also be made of pure magnesium in other embodiments, and will not be limited thereto. An oxidation occurs between the anode 310 and the seawater 320, and the electrons $e^-$ released therefrom is flowed into the cathode 100 through the wire 330. The electrons $e^-$ can be directed into the seawater 320 due to the conductivity of the metal substrate 110 and the mixture coating layer 120 and reduce the dissolved oxygen in the seawater 320. Therefore, the current can be generated stably.

Figure 7:
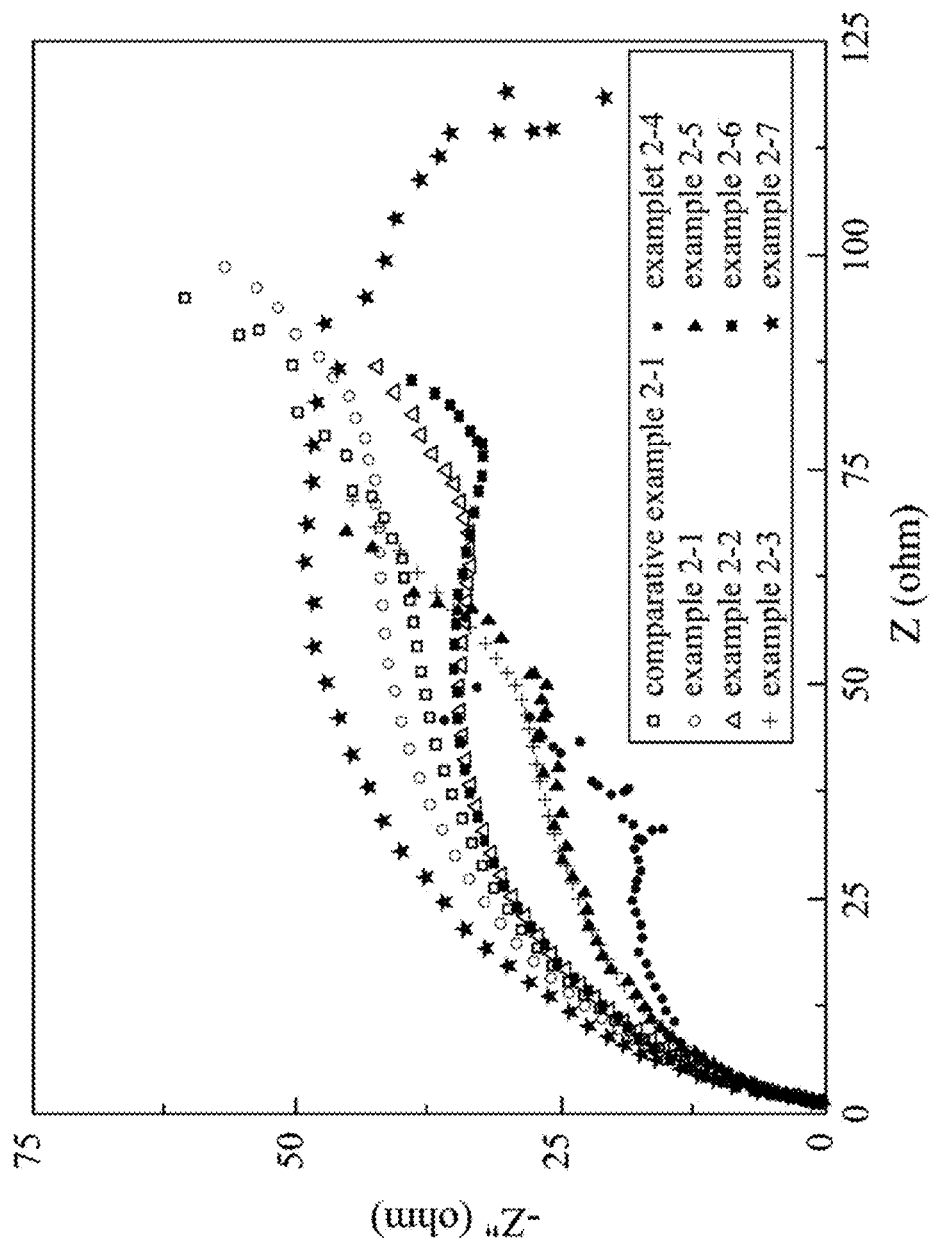
FIG. 7 shows EIS results of the s batteries for a comparative example 2-1 and seven examples 2-1 to 2-7.
Figure 8:
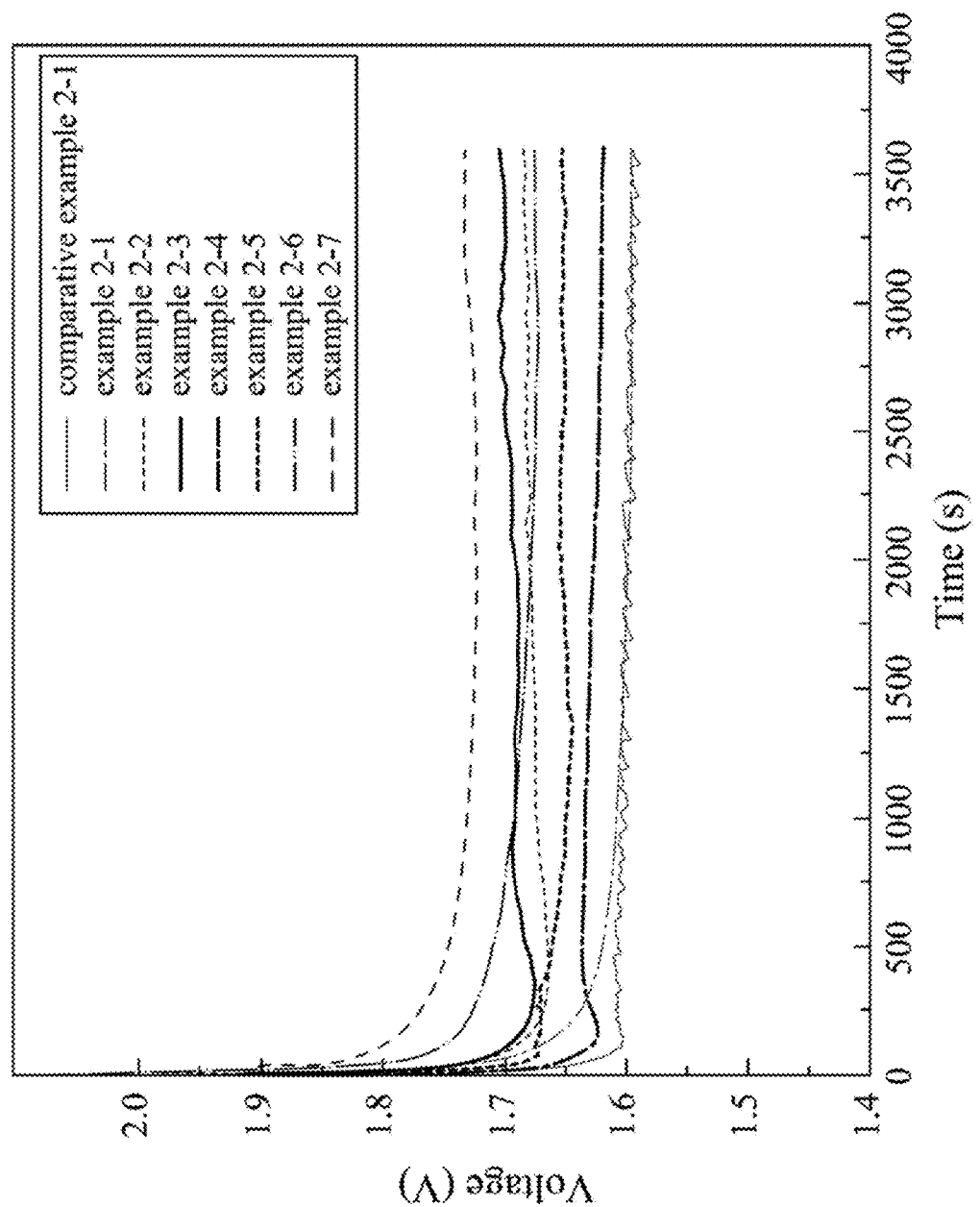
FIG. 8 shows discharging results of the seawater batteries for the comparative example 2-1 and the examples 2-1 to 2-7.
Figure 9:
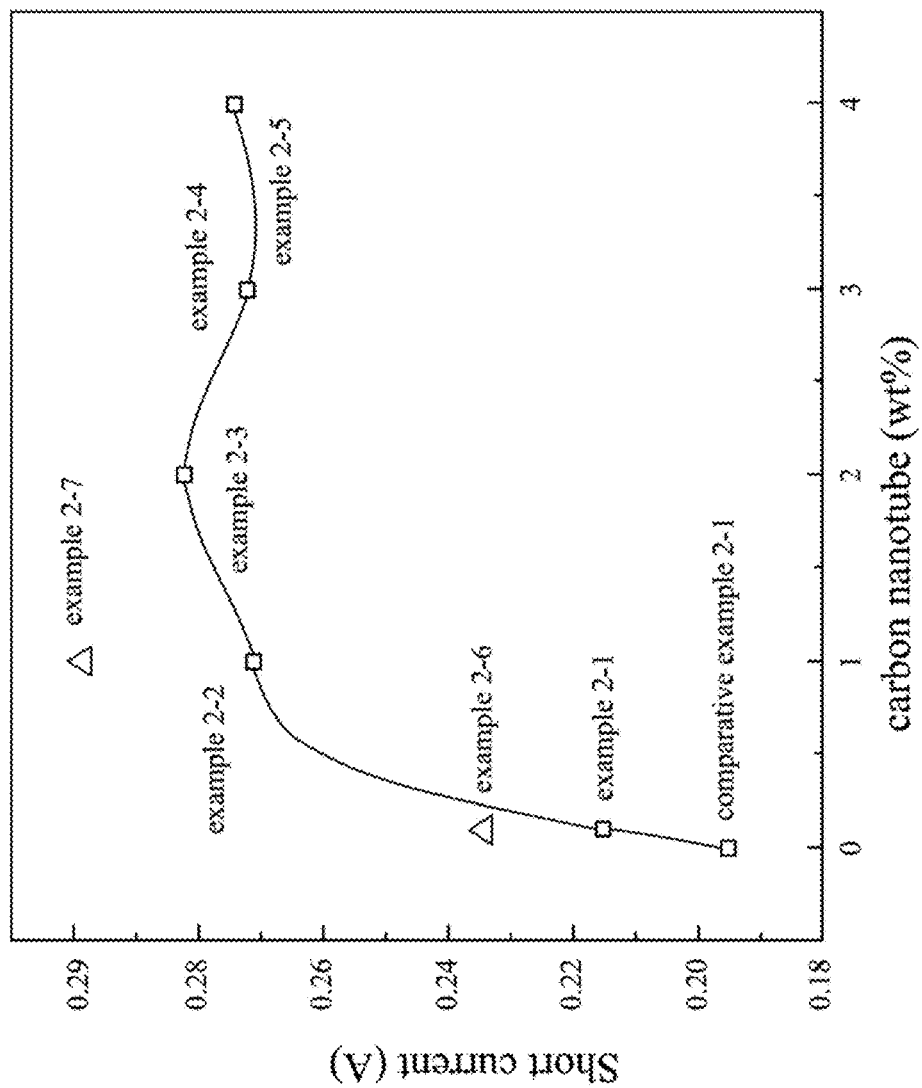
FIG. 9 shows results of short currents of the seawater batteries for the comparative examples 2-1 and the examples 2-1 to 2-7.

FIG. 7 shows EIS results of the seawater batteries for a comparative example 2-1 and seven examples 2-1 to 2-7. FIG. 8 shows discharging results of the seawater batteries for the comparative example 2-1 and the examples 2-1 to 2-7. FIG. 9 shows results of short currents of the seawater batteries for the comparative examples 2-1 and the examples 2-1 to 2-7. A cathode of the comparative example 2-1 is made by a metal substrate, and each of the cathodes of the examples 2-1 to 2-7 is made by the metal substrate 110 covered by the mixture coating layer 120 as stated above. Each metal substrate of the comparative example 2-1 and the examples 2-1 to 2-7 is a mesh-shaped substrate made of nickel with an area equal to 30 cm$^2$, in which a length is 6 cm and a width is 5 com. The conductive polymer materials are all PEDOT:PSS. The carbon nanotubes are single-wall carbon nanotubes or multi-wall carbon nanotubes. And in fabrication processes, the weight percentage of the carbon nanotubes of each of the comparative example 2-1 and the examples 2-1 to 2-7 is different from each other, as shown in Table 2.

TABLE 2

| | Comparative example 2-1 | Example 2-1 | Example 2-2 | Example 2-3 |
|---|---|---|---|---|
| Carbon nanotube wt % | 0 | 0.1 | 1 | 2 |
| Type of carbon nanotube | — | single-wall | single-wall | single-wall |

| | Example 2-4 | Example 2-5 | Example 2-6 | Example 2-7 |
|---|---|---|---|---|
| Carbon nanotube wt % | 3 | 4 | 0.1 | 1 |
| Type of carbon nanotube | single-wall | single-wall | multi-wall | multi-wall |

Solution resistances (Rs) and polarization resistances (Rp) of EIS results for the comparative example 2-1 and the examples 2-1 to 2-7 are shown in Table 3. It can be known from FIG. 7 and Table 3 that the resistances of the examples 2-1 to 2-7 are lower than the resistance of the comparative example 2-1.

TABLE 3

|  | Comparative example 2-1 | Example 2-1 | Example 2-2 | Example 2-3 |
|---|---|---|---|---|
| Rs (ohm) | 1.857 | 1.775 | 1.589 | 1.314 |
| Rp (ohm) | 69.82 | 73.63 | 62.64 | 44.3 |
|  | Example 2-4 | Example 2-5 | Example 2-6 | Example 2-7 |
| Rs (ohm) | 1.406 | 1.436 | 1.765 | 1.585 |
| Rp (ohm) | 34.21 | 40.2 | 70.85 | 87.66 |

It can be known form FIG. 8 that comparing to the comparative example 2-1, the examples 2-1 to 2-7 has higher voltages while discharging, and the discharging states are stable as time passing. It can be known from FIG. 9 that the short currents of the examples 2-1 to 2-7 are higher than the short current of the comparative example 2-1 and have better efficiency. Hence, when the metal substrate of the cathode is covered by the mixture coating layer, the characteristics of the seawater battery can be improved efficiently. Moreover, if the weight percentage of the carbon nanotubes of the mixture coating liquid is larger than or equal to 1 and smaller than or equal to 6, the characteristics of the seawater battery becomes excellent.

Figure 10:
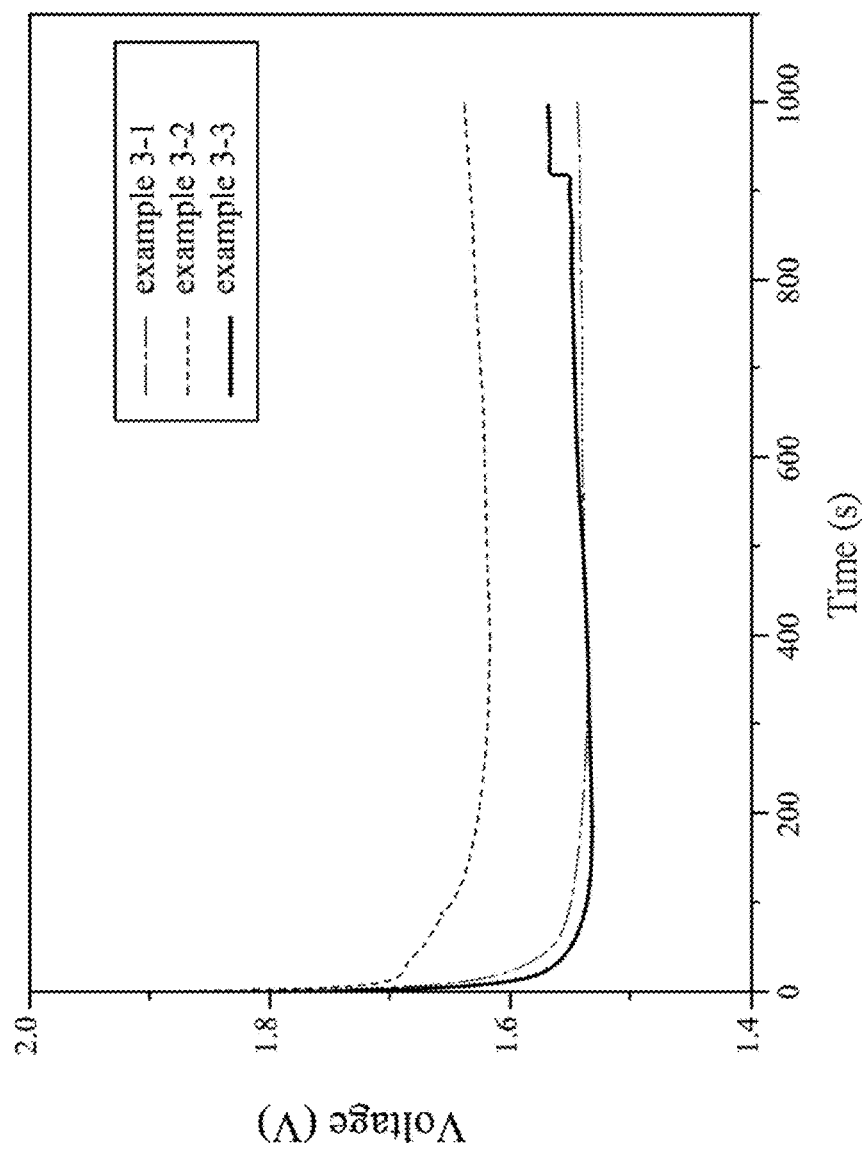
FIG. 10 shows discharging results seawater batteries for three examples 3-1 to 3-3.
Figure 11:
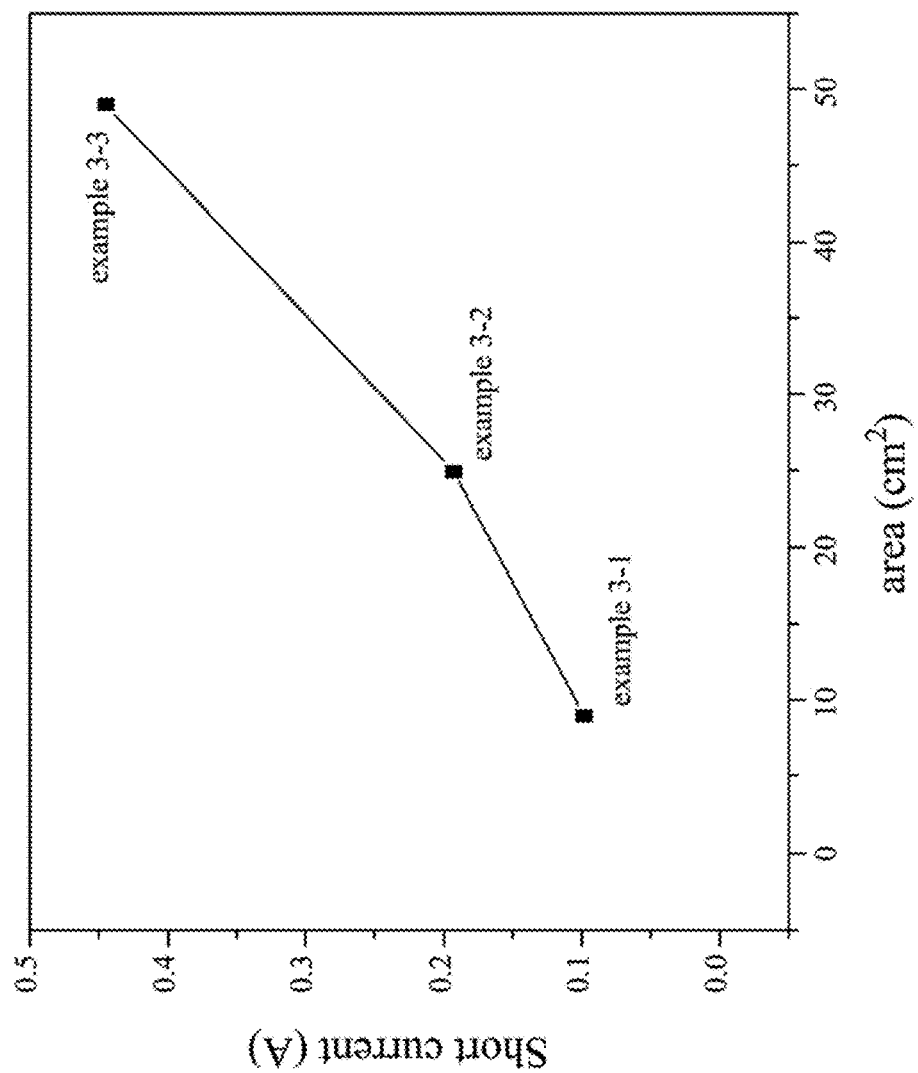
FIG. 11 shows results of short currents of the seawater batteries for the examples 3-1 to 3-3 in connection with cathode areas.

FIG. 10 shows discharging results of the seawater batteries for the three examples 3-1 to 3-3. FIG. 11 shows results of short currents of the seawater batteries for the examples 3-1 to 3-3 in connection with the cathode areas. The anodes of the examples 3-1 to 3-3 are all made of the same material and each has an area equal to 49 cm². The cathodes of the examples 3-1 to 3-3 are rectangular and made by metal substrate 110 covered by the mixture coating layer 120 as stated above. Each metal substrate of the examples 3-1 to 3-3 is a mesh-shaped substrate made of nickel in a rectangle shape. The conductive polymer materials of the examples 3-1 to 3-3 are all PEDOT:PSS. The carbon nanotubes of the examples 3-1 to 3-3 are single-wall carbon nanotubes, and the weight percentages of the carbon nanotubes of each of the examples 3-1 to 3-3 is 0.1. The areas of the cathodes of each of the examples 3-1 to 3-3 are different, as shown in Table 4.

TABLE 4

|  | Example 3-1 | Example 3-2 | Example 3-3 |
|---|---|---|---|
| area(cm²) | 9 | 25 | 49 |

As shown in FIG. 10, the cathodes with different areas have different discharging results. In FIG. 11, the larger area of the cathode causes larger short current, and the efficiency of the seawater during operating will become larger due to larger area. As a result, the power of the seawater battery can be changed by changing the area of the cathode.

Figure 12:
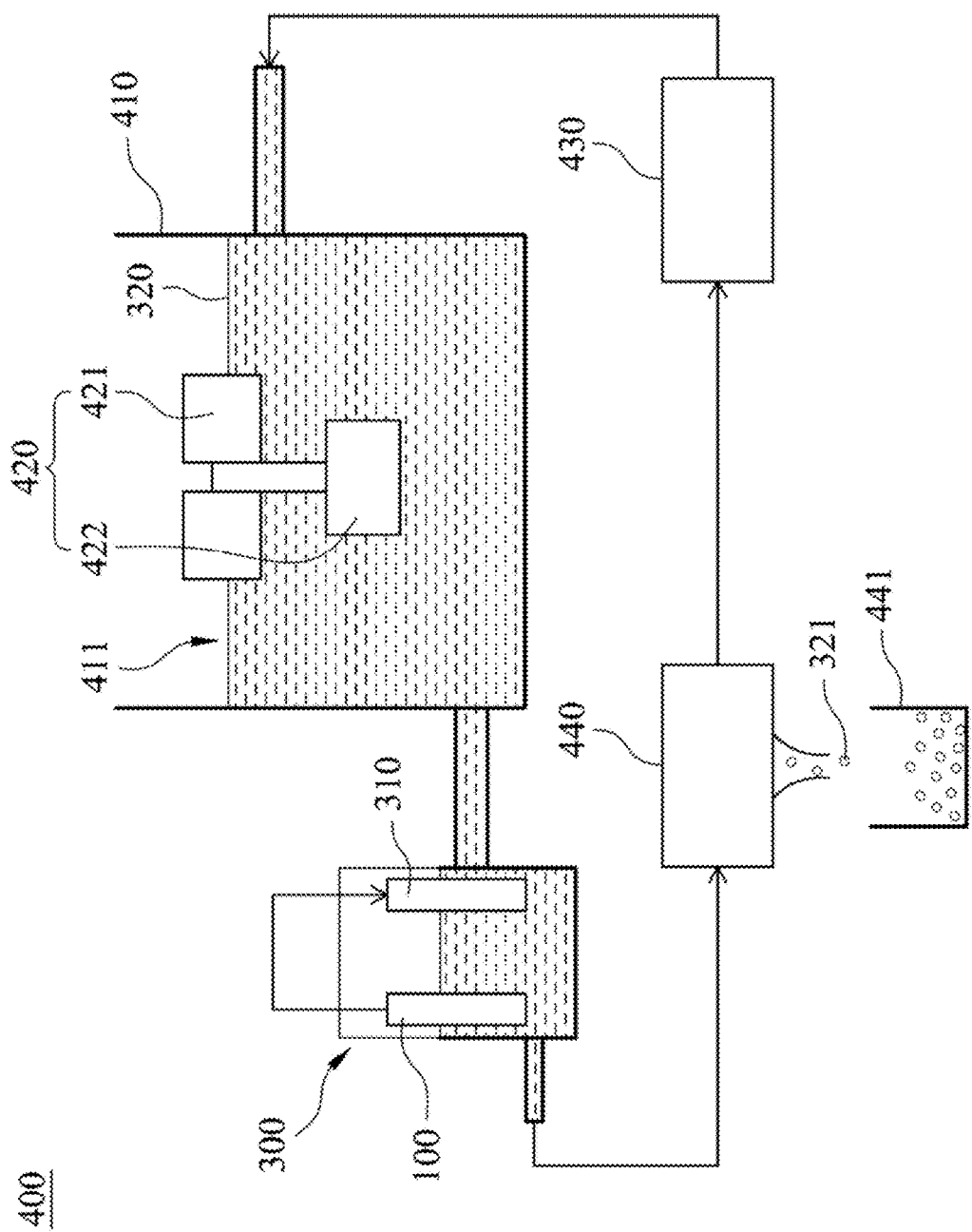
FIG. 12 shows a schematic diagram of a seawater battery circulation system according to one embodiment of the present disclosure.

FIG. 12 shows a schematic diagram of a seawater battery circulation system 400 according to one embodiment of the present disclosure. The seawater battery circulation system 400 is applied for a seawater 320 and includes a pumping device 430, a seawater storing device 410, an aerating device 420 and a seawater battery 300. The pumping device 430 is for pumping the seawater 320. The seawater storing device 410 connected to the pumping device 430 is for storing the seawater 320. The aerating device 420 disposed in the seawater storing device 410 is for increasing an amount of dissolved oxygen of the seawater 320. The seawater battery 300 is connected to the seawater storing device 410 and allows the seawater 320 flowing in to produce a power.

The pumping device 430 can be disposed on a land or a ship, which can be a pump motor to draw the seawater 320 from the ocean. The seawater storing device 410 can also be disposed on the land or the ship and includes a receiving space 311, which can be a cask, or a tank, or other structure containing a receiving space. The aerating device 420 can be a water aerator which includes a plurality of blades 421 and a driving module 422, and the blades 421 are driven by the driving module 422 to agitate the seawater 320. But the structures of the pumping device 430, the seawater storing device 410 and the aerating device 420 are not limited thereto.

To be more specific, the seawater 320 pumped by the pumping device 430 will flow into the receiving space 411 of the seawater storing device 410. Through the agitation of the aerating device 420, the seawater 320 has more chance to contact with air so as to increase the amount of the dissolved oxygen. The seawater battery 300 is connected to the seawater storing device 410, the seawater 320 which has more amount of dissolved oxygen continually flows into the seawater battery 300 to cooperate with the anode 310 and the cathode 100 for power generation.

The increase of the amount of the dissolved oxygen in the seawater 320 can provide more oxygen for the seawater battery 300 and the ability of the power generation of the seawater 300 will be improved. Because the seawater 320 is flowable, the dissolves oxygen will not exhaust easily by the usage of the seawater battery 300.

Figure 13:
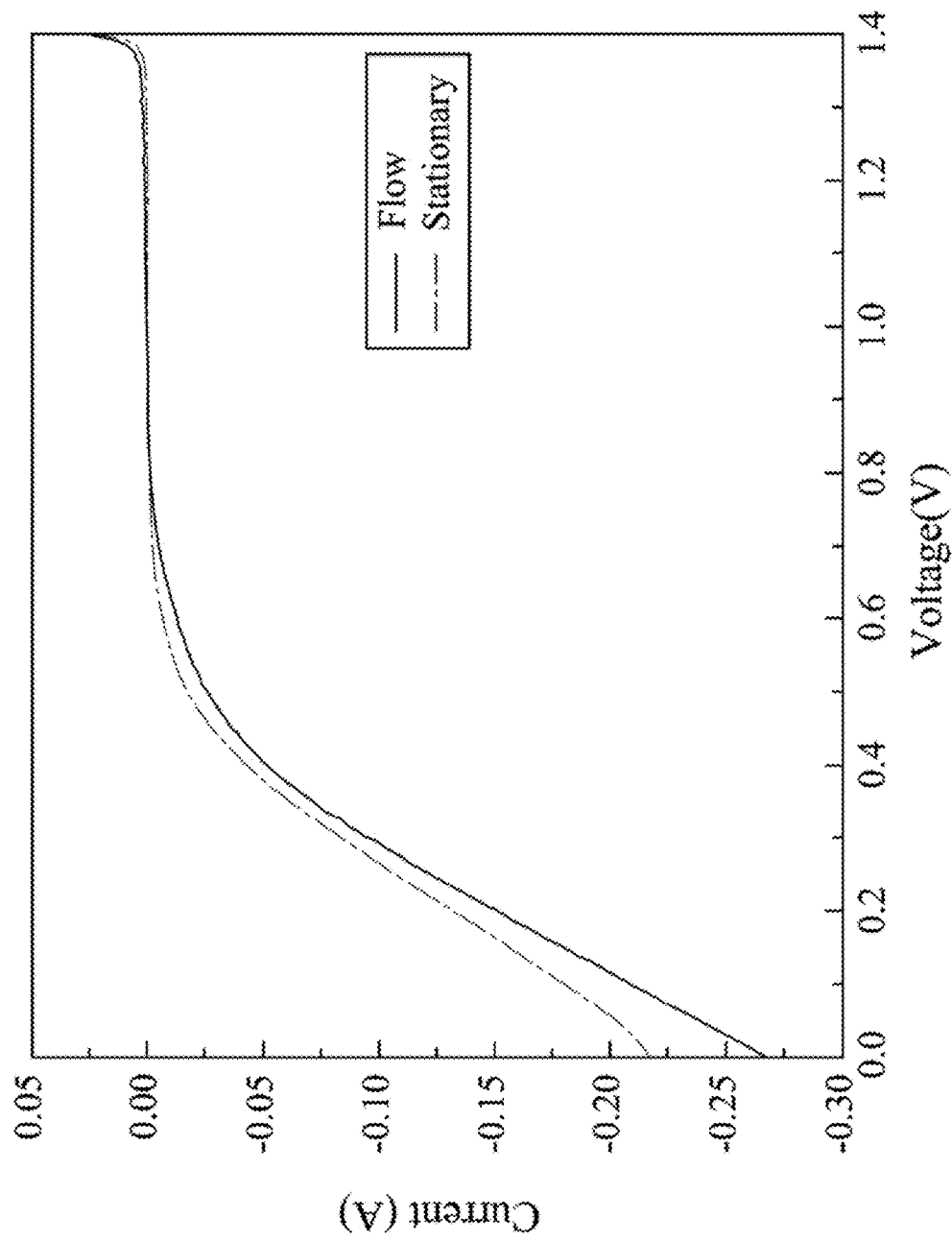
FIG. 13 shows voltage-current characteristics for stationary seawater and flowable seawater.

FIG. 13 shows voltage-current characteristics for stationary seawater and flowable seawater. As shown in FIG. 13, the short current of a seawater battering applied a flowable seawater 320 is 269 mA, and the short current of a seawater battering applied a stationary seawater 320 is 217 mA. The seawater battery applied in the flowable seawater is proved to have better efficiency.

In FIG. 12, the seawater battery circulation system 400 further includes a filtering device 440, which is connected to the pumping device 430 for filtering an impurity 321 of the seawater 320. The filtering device 440 includes a precipitate collecting device 441 for collecting the impurity 321.

In the embodiment of FIG. 1 the seawater battery 300 further connects, to the filtering device 440. Hence, the seawater 320 passing through the seawater battery 300 can be reused. However, the seawater passing through the seawater 320 can be released into the ocean directly, and other seawater of the ocean can be pumped by the pumping device 430 after passing through the filtering device 440.

Figure 14:
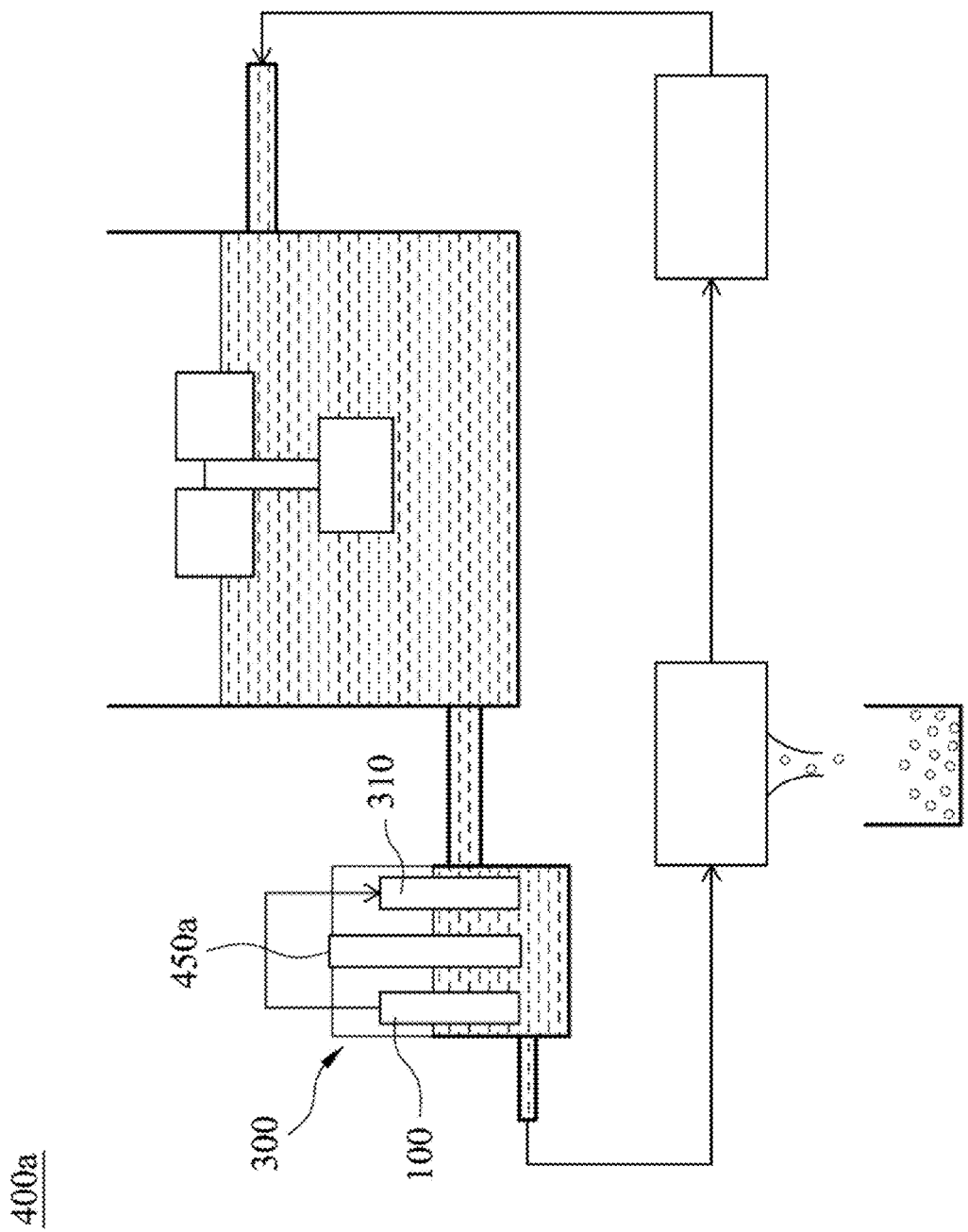
FIG. 14 shows a schematic diagram of a seawater battery circulation system according to another embodiment of the present disclosure.

FIG. 14 shows a schematic diagram of a seawater battery circulation system 400a according to another embodiment of the present disclosure. FIG. 15A shows a three dimensional view of an adjusting unit 450a of FIG. 14. FIG. 15B shows another three dimensional view of the adjusting unit 450a of FIG. 14. The structure of the seawater battery circulation system 400a is similar to the structure of the seawater battery circulation system 400 of FIG. 12, but the seawater battery circulation system 400a further includes a adjusting unit 450a disposed inside the seawater battery 300, which is disposed between the cathode 100 and the anode 310.

In detail, the adjusting unit 450a includes a first frame 451a and a second frame 452a. The second frame 452a is corresponding to the first frame 451a and is abutted against the first frame 451a. The structure and size of the first frame 451a are the same as the structure and size of the second frame 452a. The first frame 451a includes a plurality of first ribs 453a spaced from each other, and the second frame 452a includes a plurality of second ribs 454a spaced from each other. The first frame 451a is movable between a first position and a second position with respect to the second frame 452a. When the first frame 451a is at the first position, as shown in FIG. 15A, each of the first ribs 453a overlaps with each of the second ribs 454a, and the flowing quantity of the seawater is Q1. On the other hand, when the first frame 451a is at the second position, as shown in FIG. 15B, each of the first ribs 453a is staggered from each of the second ribs 454a, and the flowing quantity of the seawater is Q2 which is smaller than Q1.

The flowing quantity of the seawater can be adjusted via the relative position between the first frame 451a and the second frame 452a. The reaction areas of the electrodes of the seawater battery 300 can be changed accordingly. The power of the seawater battery 300 can be changed as well as the area changed. Hence, the selectivity under usage can be increased duo to the disposition of the adjusting unit 450a.

Based on the embodiments and the examples described above, the present disclosure has the following advantages.

1. The mixture coating layer coated on the metal substrate can prevent the metal substrate from corroded by the seawater. Because the mixture coating layer is a mixture containing the conductive polymer material and carbon nanotubes, the coating layer is conductive owing to the conductivity of the conductive polymer material. Furthermore, the combination of the carbon nanotubes can improve the conductivity and the mechanical strength to facilitate for increasing the life time and conductivity of the cathode of the seawater battery. It also has advantages of low pollution and environment protection.

2. The total area of the cathode of the seawater battery will increase if the metal substrate is a mesh-shaped substrate. When contact with the seawater, a contacting area of the mesh-shaped substrate is larger than that of a board substrate. As a result, the seawater battery containing the cathode with mesh-shaped substrate can increase the ability of power generation.

3. The oxidation resistance will increase if the metal substrate is made of nickel.

4. The conductivity is high and the fabrication method of a cathode becomes easier if the conductive polymer material is PEDOT:PSS.

5. Forming a mixture coating liquid in the fabrication process can assist the conductive polymer material and the carbon nanotubes of the mixture coating layer to be covered on the metal substrate. If the carbon nanotubes are coated on the metal substrate before the conductive polymer material is coated, the carbon nanotubes and the conductive polymer material are easier to peel and loose a function of protection because the bonding strength between the conductive polymer material and the carbon nanotubes is larger than that between the carbon nanotubes and the metal substrate. One the other hand, if the conductive polymer is coated on the metal substrate before the carbon nanotubes are coated, the conductive polymer is cured on the metal substrate and the bonding strength between the carbon nanotubes and the conductive polymer material becomes weak; therefore, the carbon nanotubes are hard to be coated on the metal substrate. Furthermore, the carbon nanotubes is exposed and cannot be protected by the conductive polymer material. As a result, the carbon nanotubes are easier to peel. Hence, the fabrication is simplified and the structure strength is increased if combining the conductive polymer material and the carbon nanotubes to form the mixture coating liquid before coating the metal substrate.

6. In the fabrication of the cathode, the ways of mixing the conductive polymer material and the carbon nanotubes under the storage temperature of the conductive polymer material and drying the mixture coating layer under the room temperature can remain the essential properties of the materials and can reduce the possibility of metal phase transformation or can prevent the inner stress from occurring in the metal substrate due to high temperature.

7. The characteristic of the cathode becomes better if the weight percentage of the carbon nanotubes of the mixture coating liquid is larger than or equal to 1 and smaller than or equal to 6.

8. The seawater battery circulation system can increase the dissolved oxygen to improve the efficiency of the seawater battery.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A cathode of a seawater battery, comprising:
   a metal substrate; and
   a mixture coating layer covered on the metal substrate, and comprising:
      a conductive polymer material; and
      a plurality of carbon nanotubes mixed with the conductive polymer material.

2. The cathode of claim 1, wherein the metal substrate is a nickel substrate.

3. The cathode of claim 2, wherein the metal substrate is a mesh-shaped substrate.

4. The cathode of claim 1, wherein the conductive polymer material is PEDOT:PSS.

5. The cathode of claim 1, wherein each of the carbon nanotubes is a multi-wall carbon nanotube.

6. A seawater battery, comprising:
   an anode; and
   a cathode corresponding to the anode, wherein the cathode cooperates with the anode to produce a current, and the cathode comprises:
      a metal substrate; and
      a mixture coating layer covered on the metal substrate, and comprising:
         a conductive polymer material; and
         a plurality of carbon nanotubes mixed with the conductive polymer material.

7. The seawater battery of claim 6, wherein the metal substrate is a nickel substrate, and the anode is made of magnalium.

8. The seawater battery of claim 7, wherein the metal substrate is a mesh-shaped substrate.

9. The seawater battery of claim 6, wherein the conductive polymer material is PEDOT:PSS.

10. A fabrication method of a cathode of a seawater battery, comprising:
    providing a metal substrate;
    forming a mixture coating liquid, wherein the mixture coating liquid comprises a conductive polymer material and a plurality of carbon nanotubes;

coating the mixture coating liquid on the metal substrate; and drying the mixture coating liquid at a room temperature to form a mixture coating layer on an outside surface of the metal substrate.

11. The fabrication method of claim 10, wherein the step of forming the mixture coating liquid comprises:

mixing the conductive polymer material and the carbon nanotubes at a storage temperature to form a mixture liquid; and shaking the mixture liquid at the storage temperature via a supersonic vibration to mix the conductive polymer material and the carbon nanotubes uniformly so as to form the mixture coating liquid.

12. The fabrication method of claim 11, wherein the conductive polymer material is PEDOT:PSS, and the storage temperature is 4° C. to 8° C.

13. The fabrication method of claim 10, wherein a weight percentage of the carbon nanotubes in the mixture coating liquid is larger than or equal to 1 and smaller than or equal to 6.

14. The fabrication method of claim 10, wherein the metal substrate is a nickel substrate.

\* \* \* \* \*